UNITED STATES PATENT OFFICE.

HARRY D. BAYLOR, OF SELLERSBURG, INDIANA, ASSIGNOR TO LOUISVILLE CEMENT COMPANY, OF LOUISVILLE, KENTUCKY, A CORPORATION OF KENTUCKY.

PROCESS OF MAKING CEMENT.

1,323,953.     Specification of Letters Patent.     Patented Dec. 2, 1919.

No Drawing.     Application filed March 17, 1919. Serial No. 283,014.

*To all whom it may concern:*

Be it known that I, HARRY D. BAYLOR, a citizen of the United States, residing at Sellersburg, in the county of Clark and State of Indiana, have invented a certain new and useful Improvement in Processes of Making Cement, of which the following is a specification.

My invention relates to the production of hydraulic cement and the object is to render the cement slow setting and to impart to it a special degree of plasticity or "fatness," to make it easier to work and capable of receiving a better finish. Another object is to render the cement to a certain degree water proof. As a result, when set and dried, the mortar work resists moisture, instead of absorbing it, and this renders the work practically immune from the effects of frost or freezing weather. One of the characteristics of my invention is that the fatty or waxy content of the cement is most completely, minutely and uniformly distributed throughout the mass.

In a co-pending application filed March 17, 1919, Serial Number 283,013, I have described a process analogous to the present one in which the untreated cement has intimately mixed with it a certain amount of lime and enough water to hydrate both the lime which is added and also the lime which results from the break-up of the aluminum silicates in the original cement. In the present case wax slops or other unsaponifiable waxy material is added at a time when it can take advantage of the heat resulting from the chemical action to become thoroughly distributed throughout the mass.

To give an example of my present process, assuming that it is desired to operate upon a batch of one ton weight I take about 1620 lbs. and mix with it about 200 lbs. of quick lime. These are ground to a fineness such that about 85% of it will pass a screen of 100 mesh. I then place the ground mixture in an ordinary commercial hydrator and add just sufficient water (as near as may be determined) to completely hydrate both the calcium oxid which was added and such amount of calcium oxid as may be formed by the break-up of the aluminate in the mixture. At the same time, that is, during the hydration of the lime, I add about 30 lbs. of unsaponifiable oil or waxy material. As a cheap and suitable material for this purpose, I may use the so called "slops" resulting in the commercial production of paraffin. This material is not suitable for refined paraffin of commerce but will answer my purpose as it has the waxy characteristics and enables me to use what would otherwise be practically a waste product. The stirring in the hydrator is continued until the water all combines, whereupon the dry mass is removed from the hydrator and ground.

It will be understood that the foregoing proportions are illustrative only and that they will vary with different samples of cement; for natural cement is of course a variable product. The amount of waxy material may also be varied, although I have found that 30 lbs. to the ton will be sufficient to produce a distinctly advantageous effect in ordinary cases.

The cement produced by the above described process is not only slow setting but has a remarkable degree of plasticity or fatness which renders it of special utility in brick and tile laying where cement mortar is required—for the mortar can be mixed in larger batches, be tempered more slowly and enable the workmen to produce a more workmanlike and careful job.

My understanding is that the high quality of cement produced by this process results from two facts,—one of which is brought out in my co-pending application and is not herein claimed, and the other is peculiar to the present process. These are:

First: That the predetermined and limited amount of water which is added is taken up entirely by the lime and quick setting aluminates, but that these are prevented from solidifying the mass by the constant agitation to which they are subjected, this agitation being produced both mechanically by the action of the hydrator, and chemically or chemo-mechanically by the reaction occurring between the lime and the water.

Second: That the hydration of the lime has a particular effect upon the unsaponifiable waxy material. When lime hydrates it both generates heat and increases considerably in bulk. By introducing the waxy material at the same time as the water advantage is taken both of the heat, which increases the fluidity of the waxy matter, and of the physical "working" of the lime as the molecules move relatively to each other during the reaction which occurs. The particles, in rubbing upon each other, seem to promote thorough distribution of the fluid waxy material. In addition, as the lime has an affinity for the water, in drawing the water to the different particles of itself the lime also draws some of the fluid waxy material; in other words, particles of the oily matter are "entrained" so to speak, with the water, and hence the oil becomes very thoroughly diffused throughout the mass. As a result of this process, the oily or waxy material is diffused to a degree of thoroughness which probably could not be obtained in any other way—commercially, at least.

The thorough admixture of the oily or waxy material renders the cement water proof to a great degree, thus enabling the mortar when set, to keep out dampness. This of course makes the set or hardened mortar proof against the effects of frost or freezing—a great advantage in laying tile and in laying bricks where they will be subject to weather conditions.

Having thus described my invention what I claim as new and desire to secure by Letters Patent, is:—

1. The process of rendering cement slow setting and plastic consisting in adding quick lime to the cement, comminuting the mass, then adding oily or waxy material and simultaneously stirring in the presence of an amount of water sufficient to hydrate all the calcium oxid, and finally grinding.

2. The process of treating cement containing an aluminate consisting in bringing together cement, and quick lime, comminuting and intimately mixing the same, adding oily or waxy material and an amount of water sufficient to hydrate the amount of lime, both original and derived, stirring the mixture and grinding the resulting mass.

3. The process of treating cement to render it more plastic and slow setting, consisting in adding to the cement an unsaponifiable waxy matter and utilizing the reactive effects of quicklime and water together with a mechanical stirring action, to diffuse the waxy matter throughout the cement and to destroy the setting characteristic of any quick setting ingredients of the original cement.

4. The process of treating cement to render it more plastic and slow setting, consisting in adding to the cement an unsaponifiable waxy matter and utilizing the reactive effects of quicklime and water together with a mechanical stirring action, to diffuse the waxy matter throughout the cement and to destroy the setting characteristic of any quick setting ingredients of the original cement, the water being limited to an amount sufficient to hydrate all the quicklime, both that which is added and that which is derived during the mechanical stirring; and the resulting dry mass being finely comminuted.

5. The process of treating cement containing aluminate consisting in bringing intimately together cement and quick lime in the proportion of approximately 8 to 1, adding unsaponifiable waxy matter to an amount roughly equal to one sixtieth of the weight of the cement and lime, mixing with water to an amount sufficient to hydrate both the lime which is added and the lime which results from the break-up of the aluminates, and then finally comminuting the resulting mixture.

6. The process of treating cement containing aluminates consisting in mixing the following substances in about the proportions mentioned, viz., 1620 lbs. hydraulic cement, 200 lbs. of quick lime, finely comminuting them, then adding about 30 lbs. of unsaponifiable oily or waxy material together with enough water to hydrate both the added lime and the lime which is formed by the break-up of the aluminates, agitating the mass while the water and oily or waxy material are being added, and finally grinding the resulting mass.

7. The process of treating natural hydraulic cement consisting in adding in about the proportions mentioned 200 lbs. of quick lime to about 1620 lbs. of the cement, finely comminuting and mixing them, then adding water and about 30 lbs. of unsaponifiable oily or waxy material, these two latter being added simultaneously and at the same time being stirred into the mass; and finally grinding the resulting mass.

8. The composition of matter produced by intimately mixing hydraulic cement containing aluminates, with quick lime in the proportions of about 1620 lbs. of cement to 200 lbs. of lime, adding and simultaneously stirring into the mixture about 30 lbs. of oily or waxy material, the amount of water being just sufficient to hydrate both the lime which is added and that which results from the break-up of the aluminates, and finally comminuting the resulting mass.

9. The composition of matter produced by intimately mixing hydraulic cement containing aluminates, with quick lime in the proportions of about 1620 lbs. of cement to 200 lbs. of lime, adding and simultaneously stirring into the mixture about 30 lbs. of oily or waxy material, and about 150 lbs. of water; and finally comminuting the resulting mass.

In witness whereof, I have hereunto subscribed my name.

HARRY D. BAYLOR.